(12) United States Patent
Shrader et al.

(10) Patent No.: US 6,473,894 B1
(45) Date of Patent: Oct. 29, 2002

(54) DYNAMIC RUNTIME AND TEST ARCHITECTURE FOR JAVA APPLETS

(75) Inventors: Theodore Jack London Shrader, Austin; Bruce Arland Rich, Round Rock; Julianne Yarsa, Austin; Donna Skibbie, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,959

(22) Filed: Jan. 29, 1999

(51) Int. Cl.$^7$ ................................. G06F 9/44
(52) U.S. Cl. ................ 717/126; 717/118; 717/126; 707/501.1; 707/513; 709/217; 345/749
(58) Field of Search ............... 707/501.1, 500, 707/513, 516, 501; 709/203, 217, 227; 717/107, 167, 118, 124–126; 345/748–749

(56) References Cited

U.S. PATENT DOCUMENTS

| | | | |
|---|---|---|---|
| 5,497,463 A | 3/1996 | Stein et al. ............. | 395/200.03 |
| 5,784,553 A | 7/1998 | Kolawa et al. ......... | 395/183.14 |
| 5,790,425 A | 8/1998 | Wagle .................... | 364/551.01 |
| 5,796,952 A | 8/1998 | Davis et al. ............ | 395/200.54 |
| 5,802,291 A | 9/1998 | Balick et al. .......... | 395/200.32 |
| 5,805,829 A | 9/1998 | Cohen et al. .......... | 395/200.32 |
| 5,828,840 A | 10/1998 | Cowan et al. ......... | 395/200.33 |
| 6,108,687 A * | 8/2000 | Craig .......................... | 709/203 |
| 6,178,432 B1 * | 1/2001 | Cook et al. ................. | 707/513 |
| 6,230,172 B1 * | 5/2001 | Purnaveja et al. ........ | 707/501.1 |
| 6,301,590 B1 * | 10/2001 | Siow et al. ................. | 707/500 |

OTHER PUBLICATIONS

System for Service Level Identification in a client/Server WWW/Java Environment, Research Disclosure, Aug. 1998, pp. 1149–1150.

Improving Java's Instance of Operator: Downloading Classes on Demand, Research Disclosure, Aug. 1998, pp. 1105–1107.

\* cited by examiner

Primary Examiner—Tuan Q. Dam
Assistant Examiner—Chuck Kendall
(74) Attorney, Agent, or Firm—Jeffrey S. LaBaw; Bracewell & Patterson, L.L.P.

(57) ABSTRACT

A test/run program receives as input a list of identifiers for source pages referencing applets to be tested or run. The test/run program creates an array of the identifiers, together with parameters for each identifier, web browser to run the test under, and a number of times the source page is to be reloaded and the applets re-run. For each source page, and for each reload of a given source page, the test/run program starts the specified web browser process, loads the designated source page, and starts a fresh runtime environment for the applet. Support for a test class within the test/run program allows the applets to write success, failure, or informational results to an output file and to exit the web browser process when complete. Where a native implementation of the test class is employed, special security permissions need not be specified and the test/run program need not necessarily be run locally. In exiting the web browser process, the applets write a marker file to indicate that the applet run is complete, which the test/run program detects. Multiple applets may be automatically and repetitively loaded, each with a fresh runtime environment in a new web browser application, for testing of the applets or repeat execution of the applets changing system properties.

17 Claims, 6 Drawing Sheets

| URL ⸢214 | Parameters ⸢216 | Web Browser ⸢218 | Repeat # ⸢220 |
|---|---|---|---|
|  |  |  |  |
|  |  |  |  |
| ⋮ | ⋮ | ⋮ | ⋮ |
|  |  |  |  |

DYNAMIC RUNTIME AND TEST ARCHITECTURE FOR JAVA APPLETS

BACKGROUND OF THE INVENTION

1. Technical Field

The present invention relates in general to testing of applets or applications in a data processing system and in particular to repeated testing of a single applet or consolidated testing of multiple applets. Still more particularly, the present invention relates to automatically and repeatedly running applets in fresh native or non-native runtime environments each time.

2. Description of the Related Art

Java applets are Java programs which may be included in HyperText Markup Language (HTML) pages, much in the same manner that images may be included in such pages. The <APPLET> tag definition of HTML is employed to identify Java applets. When a Java-compatible browser is utilized to view such a page, the applet's code is transferred to the system on which the browser is executing and is executed either by the browser or by another Java runtime environment within the system.

Since they typically run in web browsers and require user intervention to run and interpret results, Java applets present a difficult testing challenge. Generally, testers must manually load the HTML page including the applet reference. If the applet is oriented toward user inter-action, the results may be viewed or otherwise determined by the tester. However, many applets do not require user interaction or generate visible output. For example, an applet may merely create several class instances and run methods against those instances. The success or failure of each method could not be determined without a tool permitting examination of the target class instances.

Additionally, designers may wish to repetitively load and run an applet during testing to verify proper operation over a target number of executions. Some tools, such as JavaScript, provide an automatic mechanism for reloading HTML pages (which could contain a Java applet). With such tools, however, after the first execution the applet will not normally be reloaded and run with a clean Java Runtime Environment (JRE). Nor can developers/testers change the source of the page after the first reload within such tools, or specify a list of pages to be repetitively reloaded. This requires developers/testers to have multiple web browsers running for each discrete page containing the applet or applets being tested, as well as for each reload of a single page.

Users of personal digital assistants (PDAs)—also referred to as personal communications assistants (PCAs) or tier-0 data processing systems and including, for example, the Palm series (Palm Pilot, Palm III, etc.) available from 3Com Corporation—are faced with a similar situation. Users may need to repeatedly run an applet within a PDA web browser application in a mobile environment. For instance, a meteorologist may need to access data from weather monitor applets on a periodic basis. However, applets may set system properties which can only be cleared with a new invocation of the web browser. New executions of the web browser may be required to run the applet with a fresh JRE on a repetitive basis.

It would be desirable, therefore, to provide a mechanism for testing or running applets which permits repetitive execution of an applet with a fresh runtime environment for each execution. It would further be advantageous for the mechanism to automatically permit consecutive testing of applets from different sources (HTML pages) or different web browsers, and to provide some tangible indication of the success or failure of methods within applets being tested or run.

SUMMARY OF THE INVENTION

It is therefore one object of the present invention to provide an improved method, apparatus, and computer program product for testing of applets or applications in a data processing system.

It is another object of the present invention to provide an improved method, apparatus, and computer program product for repeated testing of a single applet or consolidated testing of multiple applets.

It is yet another object of the present invention to provide a method, apparatus, or computer program product for automatically and repeatedly running applet in fresh native or non-native runtime environments each time.

The foregoing objects are achieved as is now described. A test/run program receives as input a list of identifiers for source pages referencing applets to be tested or run. The test/run program creates an array of the identifiers, together with parameters for each identifier, web browser to run the test under, and a number of times the source page is to be reloaded and the applets re-run. For each source page, and for each reload of a given source page, the test/run program starts the specified web browser process, loads the designated source page, and starts a fresh runtime environment for the applet. Support for a test class within the test/run program allows the applets to write success, failure, or informational results to an output file and to exit the web browser process when complete. Where a native implementation of the test class is employed, special security permissions need not be specified and the test/run program need not necessarily be run locally. In exiting the web browser process, the applets write a marker file to indicate that the applet run is complete, which the test/run program detects. Multiple applets may be automatically and repetitively loaded, each with a fresh runtime environment in a new web browser application, for testing of the applets or repeat execution of the applets changing system properties.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
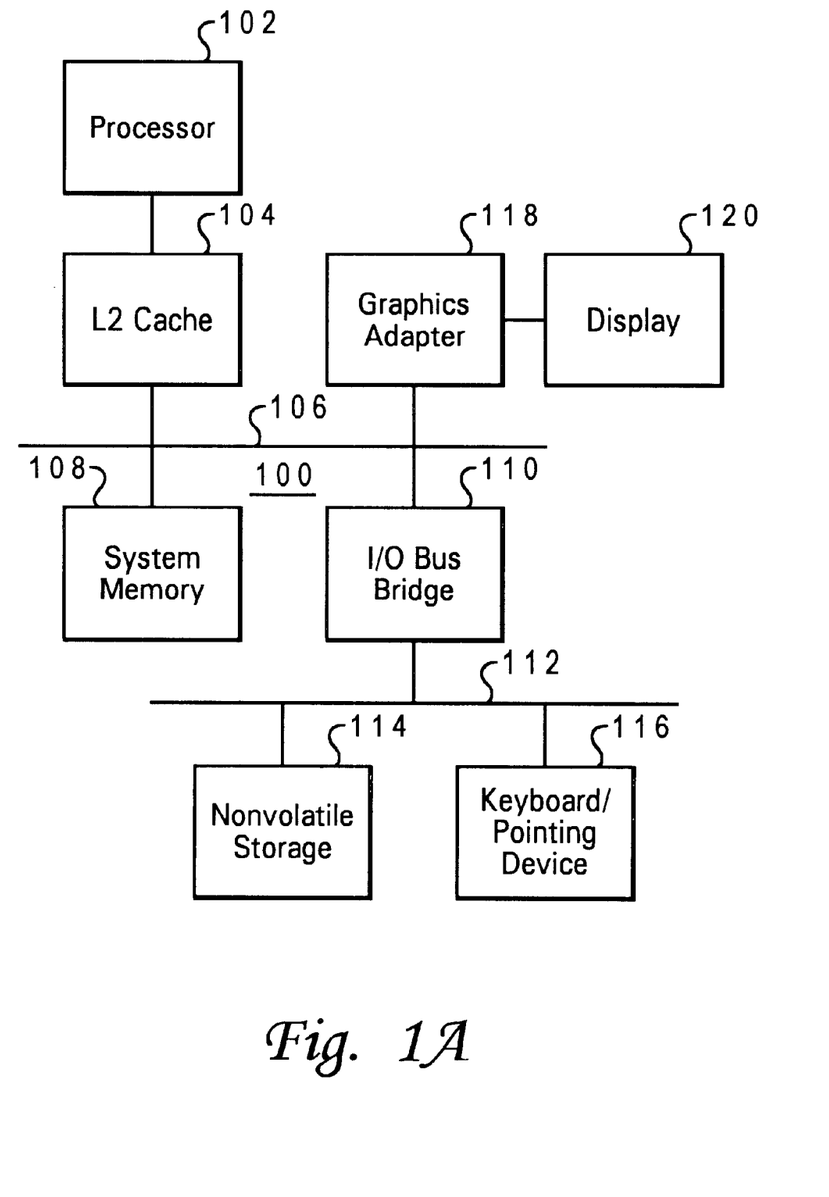
FIGS. 1A–1B depict block diagrams of data processing systems in which a preferred embodiment of the present invention may be implemented.
Figure 1B:
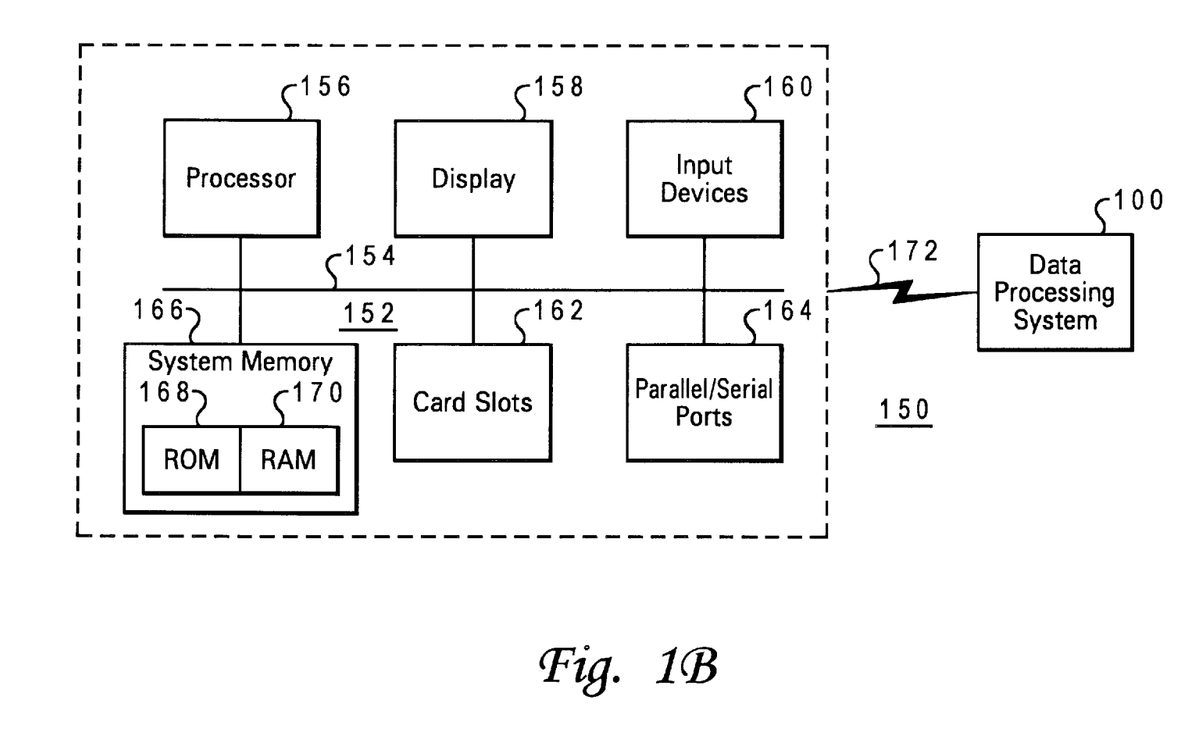

With reference now to the figures, and in particular with reference to FIGS. 1A and 1B, block diagrams of data processing systems in which a preferred embodiment of the present invention may be implemented are depicted. FIG. 1A depicts a desktop or mobile data processing system, such as one of the Aptiva or similar models of data processing systems available from International Business Machines corporation of Armonk, N.Y. Data processing system 100 includes a processor 102, which is connected in the exemplary embodiment to a level two (L2) cache 104, connected in turn to a system bus 106.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112. Data processing system 100 further includes graphics adapter 116 connected to system bus 106, receiving primitives for rendering from processor 102 and generating pixels for display 120.

The operation of data processing system 100 is well known to those skilled in the art. A basic input/output system (BIOS), power-on self-test (POST), and various startup routines initialize the hardware and permit interaction between hardware components. An operating system, such as a version of the Windows operating system available from Microsoft Corporation of Redmond, Wash., provides a platform for execution of applications and for basic user interaction, such as display of information or manipulation of a cursor within the display by a pointing device. Operating system device drivers allow software components to interact with and control hardware components.

FIG. 1B depicts a block diagram of a data processing system network in which a preferred embodiment of the present invention may alternatively be implemented. Data processing system network 150 includes a tier-0 data processing system (PDA) 152, which in turn includes a bus 154 connecting processor 156, display 158, and input devices 160 such as a pen or buttons. Bus 154 of the tier-0 data is processing system 152 may be attached to card slots 162 for connecting peripheral devices, parallel and/or serial ports 164, and any other suitable hardware. Bus 154 is also connected to memory 166, which may include read-only memory (ROM) 168 and random access memory (RAM) 160.

The operation of tier-0 data processing systems is also well-known in the art. A small operating system such as the Windows CE operating system available from Microsoft Corporation of Redmond, Wash. is stored in memory 166 and loaded at run time to control operations of the tier-0 data processing system 152 including input by a user and display of a user interface on display 158. Additionally, the operating system provides functionality supporting communications of tier-0 data processing system 152 with another data processing system 100 via communications link 172. Data processing system 100 may be a desktop data processing system such as that described above. Communications link 172 may be through a wired connection from parallel and/or serial ports 164, or a wireless (e.g., infra-red) connection.

The exemplary diagrams and descriptions herein are provided solely for the purposes of explaining the invention and do not encompass every detail of the construction and operation of data processing system(s) of the type described. Only so much of the construction and operation as is required for an understanding of the invention is described. However, those skilled in the art will recognize that numerous variations, in construction and/or operation may be employed without departing from the spirit and scope of the invention.

In the present invention, data processing system 100 or 152 also includes a JRE, such as JRE 1.1 or Java 2 JRE available from Sun Microsystems, Inc. of Mountain View, Calif., or an alternative JRE allowing Java application and applets to be executed within the data processing system in accordance with the known art. Data processing system 100 or 152 also includes a browser application operating in conjunction with the JRE as described in further detail below to allow Java applet to be tested or run repetitively with a fresh JRE for each execution and/or consecutively tested or run from different sources without user intervention.

Figure 2A:
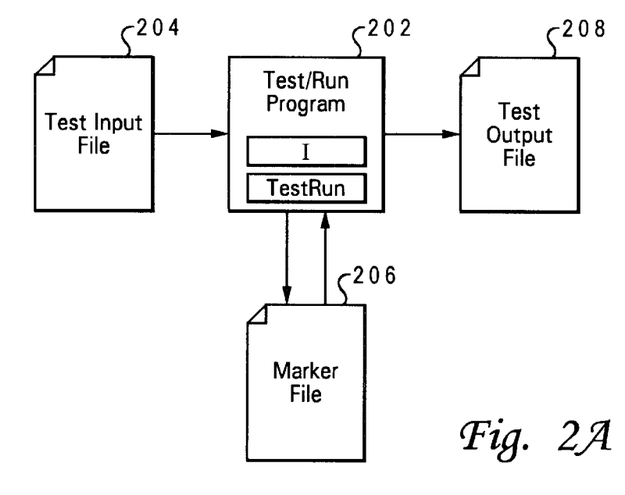
FIGS. 2A–2B are block diagrams of components in a system for testing or running applets in accordance with a preferred embodiment of the present invention.
Figure 2B:
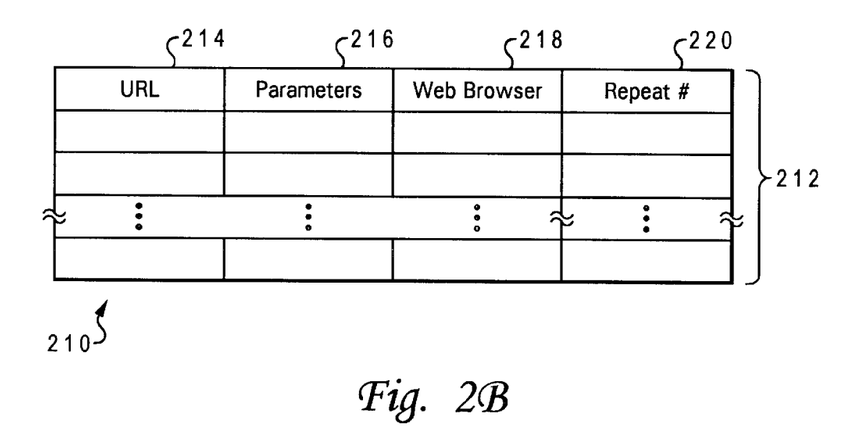

Referring to FIGS. 2A and 2B. block diagrams of components in a system for testing or running applets in accordance with a preferred embodiment of the present invention are illustrated. FIG. 2A illustrates the components employed within the general execution flow of the present invention. The components illustrated operate within data processing system 100 or 152 depicted in FIGS. 1A and 1B. The applet testing or running mechanism of the present invention includes a test/run program 202 which initially reads in the test input file 204. Test/run program 202 preferably runs on top of the operating system within the data processing system and may initiate execution of at least one JRE (not shown) also running on top of the operating system.

FIG. 2B illustrates an URL test array 210 utilized by test/run program 202. URL test array 210 includes n entries 212 each having attributes containing the URL 214 or a similar identifier for the source page including the applet(s) to be tested or run, the parameters 216, if any, to be employed in testing or running the applet, the web browser application 218 to run the test under, and the number of times 220 testing or running of the applet(B) identified by the source URL is to be repeated. URL test array 210 is created by test/run program 202 when it reads test input file 204. Test input file 204 contains the URLs and parameters for testing, but may not contain a number of times for repeating the teat or execution, which may instead default to a predetermined number.

Test/run program 202 runs the specified web browser 218 and the browser loads, in the manner of a browser application loading a page retrieved from a HyperText Transmission Protocol (HTTP) server, the source page identified in the URL component 214 and this process continues of each entry 212 within URL test array 210. The identified page corresponding to one entry in URL test array is loaded, applets within that page are executed, and the applet or applet(s) complete, bringing down the web browser. The test/run program 202 then starts another web browser with a fresh JRE and reruns the source page identified by URL component 214 for the number of times specified in the "repeat number" component 220 of url test array 210. Once an identified page has been reloaded an appropriate number of times, test/run program 202 proceeds to the next entry within URL test array 210 and loads the source page identified therein continuing with a fresh JRE, executing any applets in the new source page.

As pages are loaded and applets tested for each URL within URL test array 210, test classes within test/run program 202 create marker file 206. Test/run program 202 looks for the presence of marker file 206 before proceeding to the next URL to be tested or run. When it detects the presence of marker file 206, it proceeds to the next URL entry within URL test array 210 or next repeat count number for the current URL. As it executes, test/run program 202 writes to test output file 208.

Test run program 202 automatically spins off the specified web browser programs 218 to load the HTML pages having the applet(s) to be tested. The URL of the HTML page is the first argument to the web browser executable. The browser is run and the HTML page loaded. This, in turn results in the applet(s) being loaded and the browser JRE (or an alternative JRE specified by the system) being run. The applet(s) will run their tests, write success, informational, and/or failure records to a log file 208, write the marker file 206, and exit the browser program. Developers and testers may employ this architecture to automate the running of applets and review their output at the end of the applet runs. End users may utilize the architecture shown to repeatedly run applets requiring new browser JREs.

Test/run program 202 reads test input file 204 and creates a web browser process either sequentially or in some cases in parallel for each URL entry within test input file 202. The names of test input file 204 and test output file 208 are parameters to test/run program 202, which may be written in any language but is preferably written in Java.

Test input file 204 includes a list of URLs that contain the applets to be run. Each row may contain the name of the executable to be run and the number of times the URL should be reloaded in a new browser environment. The repeat number specification is particularly useful for applets which employ data that will not be the same after each run.

Test/run program 202 supports testing classes, including a DynamicAppletTest class that includes methods for writing a string to a file and exiting the web browser environment. Test applets may call these methods to record successes, failures, or general information statements as the applet progresses, as well as to exit the web browser application when the applet has completed. This DynamicAppletTest class is preferably provided exclusively in Java or with native methods.

Test output file 208 records the results of strings passed to methods within the DynamicAppletTest class chat are called within the applets. Marker file 206 is created by the DynamicAppletTest class exit method to indicate to test/run program 202 that the applet has exited the browser.

Developers and testers may exploit the design shown and depicted in the JRE 1.1 or Java 2 environments promulgated by Sun Microsystems, Inc. of Mountain View, Calif. For web browser JRE 1.1 environments, testers should grant the appropriate permissions required by their native browser requirements. For Java Plug-In JRE 1.1 environments, the tests should be run locally to allow the applet to run outside the privilege constraints of the sandbox. Assuming that the DynamicAppletTest class is written exclusively in Java, in Java 2 environments, testers should add the following entry to their Java policy file:

grant{
   permission java.io.FilePermission "outputtestfile", "write";
   permission RuntimePermission "exit";
}

These statements give the applet the permission to write to the local disk and to exit the browser upon completion of the applet code. Alternatively, the methods within the DynamicAppletTest class may be provided as native methods to get around the permission requirements for Java 2 and the need to run the applet locally for non-browser JRE 1.1 environments.

To test applets utilizing the design depicted and described, developers and testers need only;
1) Create or modify test applet to utilize the DynamicAppletTest class methods.
2) Create test input file 204 for test/run program 202 with all URLS 214 which need to be tested, any necessary parameters 216 for the test, web browser 218 to run the test under, and the number of times 220 each URL should be tested.
3) Modify the Java policy tile to add local test input file and exit Java Virtual Machine (JVM) permissions, it testing against Java 2. This modification is unnecessary if the tester utilizes the native implementation of the DynamicAppletTest class.
4) Run test/run program 202. The tester will see the test/run program 202 create web browser processes for each applet execution. The test/run program 202 terminates when the applets complete.
5) Examine test output file 208 when test/run program 202 completes.

When test/run program 202 is executed, it performs the following actions:
1) Read test input file 204.
2) Create an array of the different URL requests in the test input file. By default, test/run program 202 does not. create separate threads to handle each URL request since accessing each URL request sequentially will reduce the system load.
3) Loop through each URL request. For the current URL request, test/run program 202 will create a new web browser process with the URL index as input. The applet will run, write out error and status messages to test output file 208, and exit the JVM (and hence the web browser) upon completion.
4) Detect the marker file written by the exiting applet and erase it before proceeding to the next URL request. The same URL test may be repeated by rerunning the URL in a new web browser. The number of times the URL is rerun depends on the repeat number. (Test/run program 202 uses the marker file as an easy way to indicate whether the program is ready to move to the next test. Alternatively, a socket call could be utilized, but that would require another permission to be established.)
5) Exit when all URL requests are complete.

Figure 3:
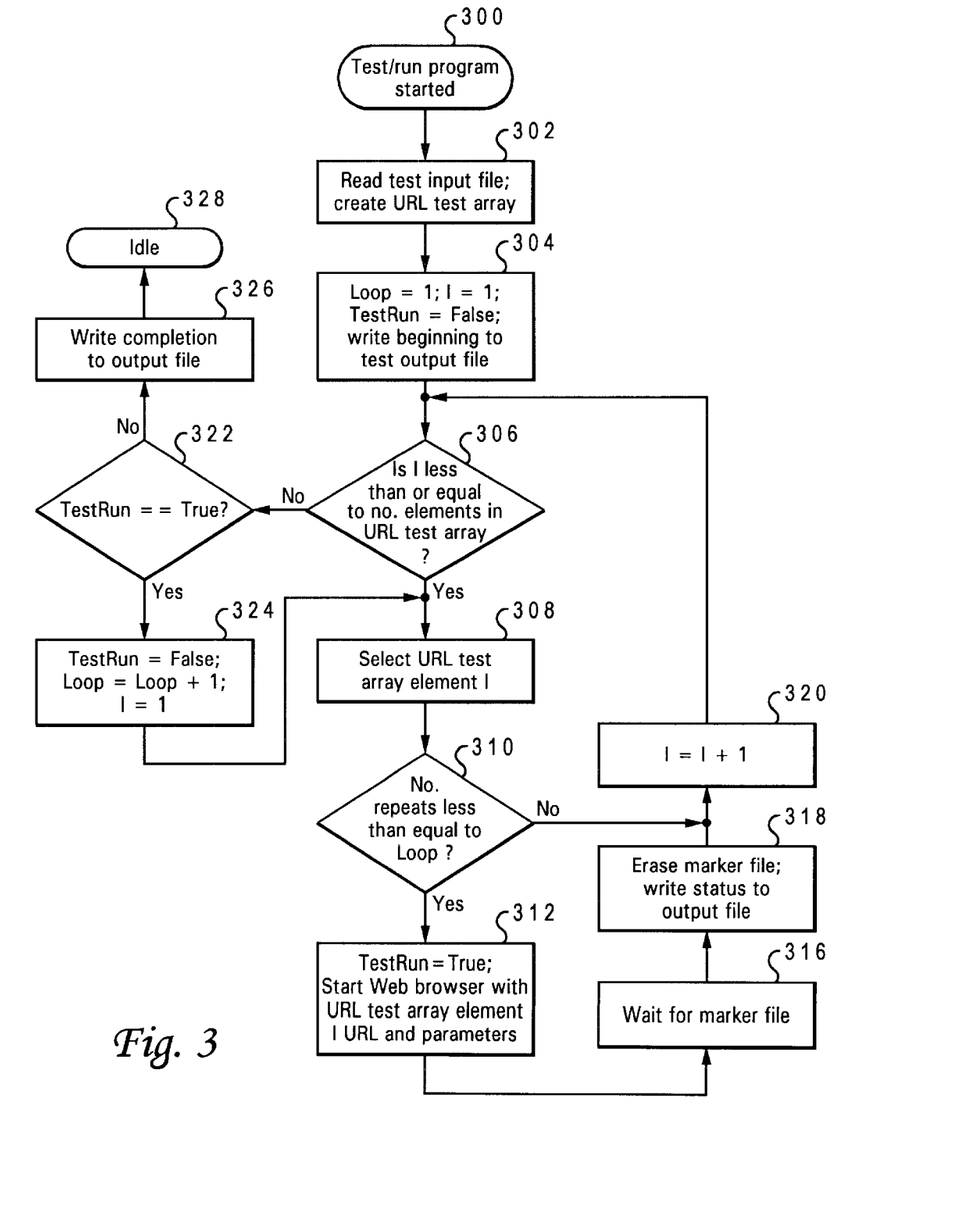
FIG. 3 depicts a high level flowchart for a process of testing or running applets in accordance with a preferred embodiment of the present invention.

With reference now to FIG. 3, a high level flowchart for a process of testing or running applets in accordance with a preferred embodiment of the present invention is depicted. The process depicted may be executed within data processing system 100 or 152 shown in FIGS. 1A–1B by the architecture described above in connection with FIGS. 2A–2B. The process begins at step 300, which depicts a test/run program for automatic and/or repetitive testing or running multiple applets each in a fresh runtime environment being started.

The process then passes to step 302, which illustrates the test/run program reading an test input file containing a list of identifiers (e.g., URLs) for source pages referencing the applets to be tested or run. The test/run program creates a test array from data within the test input file with each test array entry containing an identifier of the respective source page, parameters required for running the applet(s) to be tested by loading the identified source page, if any, web browser application under which to run the test, and a number of reloads to be performed on the identified source page.

The process next passes to step 304, which depicts setting a "Loop" counter variable employed to store the number of times each source page has been reloaded to an initial value of 1. In the example shown, each source page is to be loaded in sequence before any source page is reloaded. However, the process may be easily modified to consecutively reload one source page the specified number of times before loading subsequent source pages. The test/run program also initializes a test array index counter variable ("I") employed to identify a test array entry currently being processed to 1, sets a "TestRun" flag variable employed to indicate whether a test/run cycle has been executed to false, and begins writing status information to the test output file.

The process then passes to step 306, which depicts a determination of whether the index variable value is less than or equal to the number of elements or entries within the test array. If so, the process proceeds to step 308, which illustrates selecting test array entry I for processing. The process then passes to step 310, which illustrates a determination of whether the number of repeats specified for the selected test array entry is less than or equal to the current value of the Loop counter variable.

If so, the process proceeds to step 312, which depicts setting the TestRun flag variable to true and starting a web browser application with the selected test array entry identifier and parameters as arguments for the web browser. The source page identified within the selected test array entry is loaded using the specified parameters as necessary. The process next passes to step 316, which illustrates the test/run program waiting for the marker file to be created, indicating the execution of the applet(s) referenced within the loaded source page is complete.

Once the marker file is detected by the test/run program, the process passes to step 318, which depicts erasing the marker file and writing the status of the executed applets to the test output file, and then to step 320, which illustrates incrementing the test array index counter variable I. The process then returns to step 306 to repeat the determination of whether the current test array index counter variable value is less than or equal to the number of entries within the test array.

Referring back to step 310, if the number of repeat reloads specified for a current test array entry is greater than the current value of the Loop counter variable, the process proceeds instead directly to step 320, described above. In this manner, source pages identified within test array entries specifying lower repeat reloads are skipped in later loops through the test array required to satisfy higher repeat reload numbers specified for other test array entries. Those skipped source pages are not reloaded.

Referring back to step 306, if the current value of the test array index counter variable I is not less than or equal to the number of entries within the test array, indicating that all test array entries have been processed in the current loop through the test array, the process proceeds instead to step 322, which depicts a determination of whether the current value of the TestRun flag variable is true.

A true value for the TestRun flag variable indicates that at least one test array entry was processed during the last loop through the test array. Under such circumstances, it is possible that one or more test array entries have not yet been reloaded the specified number of times. The process thus proceeds to step 324, which illustrates setting the TestRun flag variable to false, incrementing the Loop counter variable value, and reinitializing the test array index counter variable value to 1.

The process then returns to step 308, described above. If the source page identified within each test array entry has been reloaded at least the specified number of times, the process will proceed through steps 310 to 320 and 306 without resetting the value of the TestRun flag variable to true. When, upon returning to step 322, the TestRun flag variable value is found to still be false, each test array entry has been reloaded the specified number of times and no further testing is required. The process thus proceeds instead to step 326, which depicts writing completion information to the test output file, and then passes to step 328, which illustrates the process becoming idle until applets are again to be tested or run by the test/run program.

Figure 4:
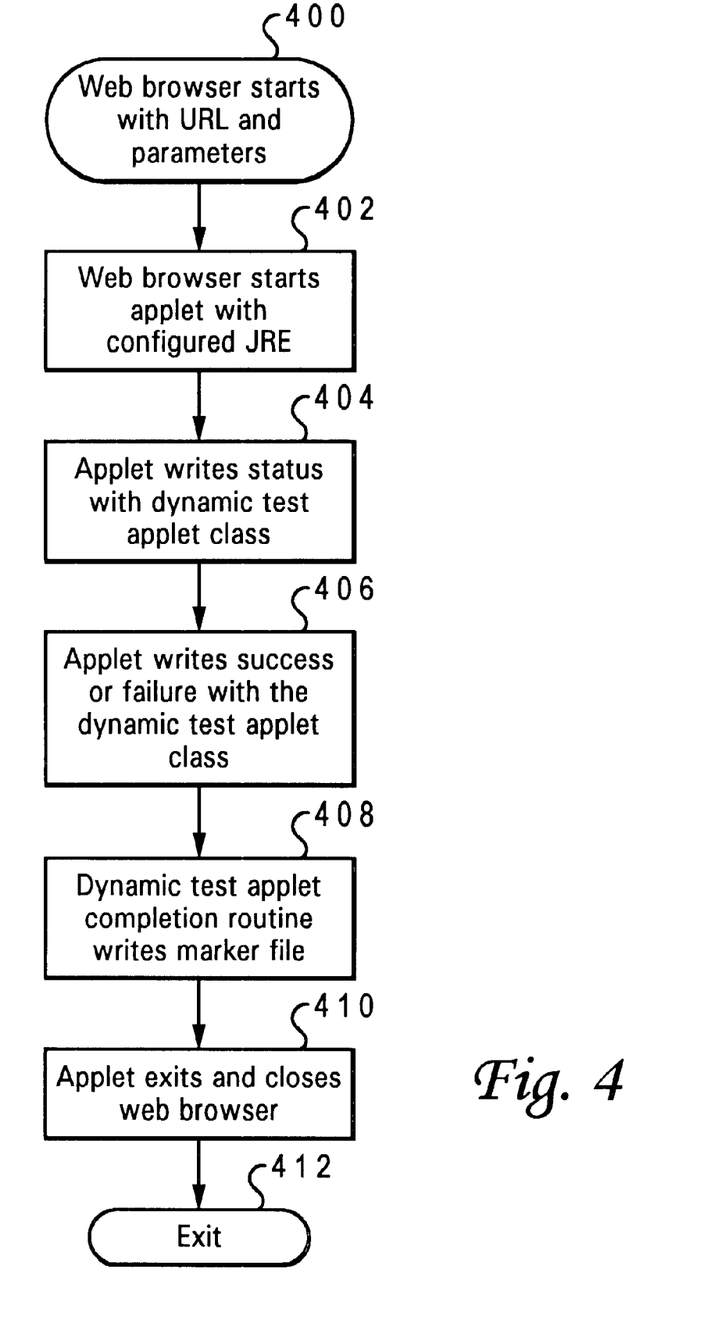
FIG. 4 is a high level flowchart for a process for loading and running applet in accordance with a preferred embodiment of the present invention.

Referring to FIG. 4, a high level flowchart for a process for loading and running applets in accordance with a preferred embodiment of the present invention is illustrated. The process begins at step 400, which depicts the web browser application being started with the URL and any parameters provided as arguments. The process then passes to step 402, which illustrates the browser starting the applet with the JRE which the browser was configured to utilize.

The process next passes to step 404, which depicts the applet, as it executes, writing status information to the test output file with the dynamic test applet class provided, such as the DynamicAppletTest class described above. The process passes next to step 406, which illustrates the executed applet writes success or failure information to the test output file utilizing the dynamic test applet class, and then to step 408, which depicts the dynamic test applet class completion routine writing the marker file to indicate completion of the execution of the applet. Calls to the DynamicAppletTest class when the applet completes, for example, will result in the creation of the marker file.

The process next passes to step 410, which illustrates the applet exiting and closing the web browser application, and finally passes to step 412, which depicts the process exiting until the web browser is again started to execute a test applet.

Although the description above assumes that only one web browser and one JRE are employed, the present invention may be readily extended to test applets in different web browsers and different JREs. For example, instead of a single execution, the applet may be serially tested utilizing Netscape Navigator from Netscape Communications Corporation of Mountain View, Calif., then Internet Explorer from Microsoft Corporation of Redmond, Wash., and any other web browser application desired. Similarly, the applet may be serially tested utilizing JRE 1.1 from Sun Microsystems, Inc. of Mountain View, Calif., Java 2 JRE also from Sun Microsystems, Inc., or any other JRE desired. Applets testing may thus include execution within a battery of web browser applications and/or JRES.

Figure 5:
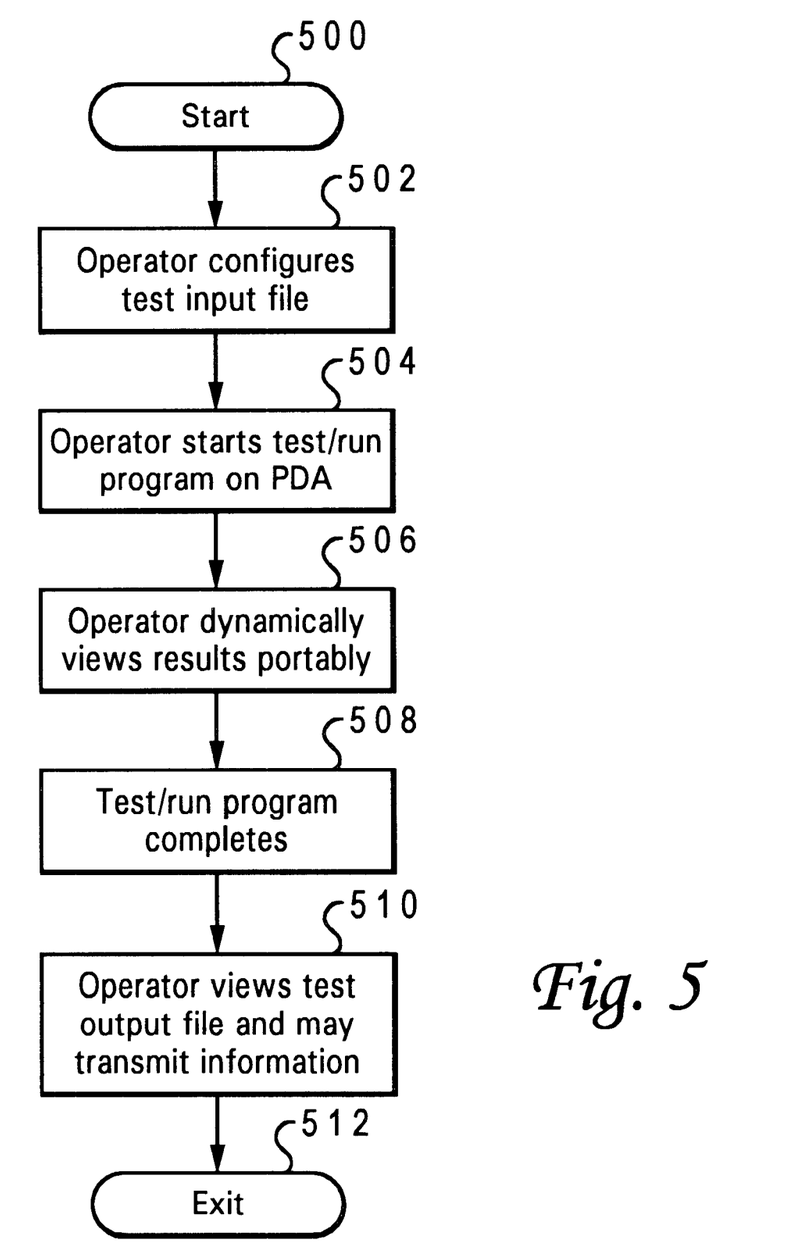
FIG. 5 depicts a high level flowchart for a process of employing the applet test/run mechanism within a PDA in accordance with a preferred embodiment of the present invention.

With reference now to FIG. 5, a high level flowchart for a process of employing the applet test/run mechanism within a PDA in accordance with a preferred embodiment of the present invention is depicted. The process begins at step 500, which depicts the process being started. The process then passes to step 502, which illustrates the PDA operator configuring the test input file within the applets which are to be executed in a fresh JRE.

The process next passes to step 504, which depicts the PDA operator starting the test/run program of the present invention on the PDA. To insure that system property settings by an applet do not remain and affect subsequent executions of the same or other applets, the test/run program of the present invention starts a browser application for each applet and closes the browser application at the end of execution of the applet, restoring any system properties changed during execution of the applet.

The process next passes to step 506, which illustrates the operator dynamically viewing the results of the applet execution on the PDA in a portable fashion, and then to step 508, which depicts the test/run program completing execution of the applet(s). The process passes next to step 510, which illustrates the operator viewing the test output file and optionally transmitting information, and then to step 512, which depicts the process exiting until again invoked to execute applets in a PDA. The process depicted and described is particularly suited to data collection applets of the type previously mentioned, which repetitively access a web site for data measurements; and may alter PDA system properties during execution. Collected data may be transmitted via the Internet, infrared capabilities of the PDA, removable nonvolatile memory, or another transport mechanism.

The present invention allows applets to be repetitively executed with a fresh JRE instance for each execution, and allows a group of applets to be collectively tested. The results of applet execution may be captured through string writes employing methods within the DynamicAppletTest class, and completion of applet execution is easily detected by creation of a marker file by similarly employing methods within the DynamicAppletTest class.

The design of the present invention is well suited for applets which run tests and do not require user interaction. The architecture offers many benefits over alternative designs written in JavaScript, and additionally supports applets running in the browser's JRE or a separate JRE, as specified by the Java Plug-in from JavaSoft. The present invention is not limited to test applets, but may be applied to execution of applets which run and need to be reloaded and rerun multiple times. The design of the present invention may also be applied to applications. As with applets, applications would need to make error, failure, and status information DynamicAppletTest method calls (or equivalent), as well as call the exit method before termination completely.

Although geared to testing and running applets that do not require user interaction, this invention could also run applets that utilize a graphical user interface and user interaction. For example, the test input file could list a number of interactive applets. When the user or tester executes the test/run program, the first interactive applet would run until the user or tester closed the applet, thus creating the marker file. The test/run program would then run the next interactive applet, and so forth until all interactive applets were run their specified number of times. This invention provides an easy way for the user to run multiple interactive applets for use or testing without having to start each one individually.

This invention could also be extended to include a Java 2 Java policy file that contains a set of permissions for each applet test entry. The field would take the form of a file name that is part of the test entry row that includes the source file, parameters, web browser application name, and number of times to run the test. Before the test/run program starts the web browser with the test source file, the test/run program would copy the specified Java policy file into the JRE's configuration. This process would ensure that a unique Java policy file was used for each test, as opposed to one Java policy file associated with one test input file.

It is important to note that while the present invention has been described in the context of a fully functional system, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of executing applets, comprising:

starting a browser application;

loading a first source page in the browser application to initiate execution, in a runtime environment, of an applet referenced within the first source page;

detecting completion of the applet execution;

exiting the browser application;

reloading the first source page, each time in a new browser application, a specified number of times to initiate execution of the applet referenced within the first source page within the fresh instance of the runtime environment;

starting the browser application; and loading a second source page in the browser application to initiate execution, in a fresh instance of the runtime environment, of an applet referenced within the second source page.

2. A method of executing applets, comprising:

starting a first runtime environment;

initiating execution of a first applet in the first runtime environment;

detecting completion of the applet execution;

re-initiating execution of the first applet a specified number of times, each time in a fresh instance of the first runtime environment;

starting a second runtime environment; and initiating execution of a second applet in the second runtime environment.

3. The method of claim 2, wherein the step of initiating execution of a second applet in the second runtime environment further comprises:

initiating a repeat execution of the first applet in the second runtime environment.

4. A method of testing applets, comprising:

creating an array of source page identifiers; and testing a plurality of applets by performing, separately for each source page identifier within the array, the steps of:

selecting a source page identifier from the array;

starting a browser application;

loading a source page corresponding to the selected source page identifier in the browser application to initiate execution, in a runtime environment, of all applets referenced within the source page;
detecting completion of the applet execution;
exiting the browser application; and
reloading, in a new browser application each time, the source page corresponding to the selected source page identifier a number of times specified within the array,
wherein applets referenced within different source pages corresponding to different source page identifiers within the array are executed within different instances of the runtime environment.

5. The method of claim 4, wherein the step of creating an array of source page identifiers further comprises:
creating an array containing URLs for a plurality of HTML pages.

6. The method of claim 4, wherein the step of creating an array of source page identifiers further comprises:
storing, in association with each source page identifier within the array, parameters for execution of applets referenced within a source page corresponding to the source page identifier, a web browser to be employed in loading the source page, and a number of times the source page is to be reloaded.

7. A system for executing applets, comprising:
a data processing system;
an operating system running within the data processing system;
a memory accessible by the data processing system containing an array of source page identifiers; and
a program running within the data processing system and initiating execution of at least one applet by performing, separately for each source page identifier within the array, the steps of:
selecting a source page identifier from the array;
starting a browser application;
loading a source page corresponding to the selected source page identifier in the browser application to initiate execution, in a runtime environment, of all applets referenced within the source page;
detecting completion of the applet execution;
exiting the browser application; and
reloading, in a new browser application each time, the source page corresponding to
the selected source page identifier a number of times specified within the array, wherein applets referenced within different source pages corresponding to different source page identifiers within the array are executed within different instances of the runtime environment.

8. The system of claim 7, wherein the array of source page identifiers further comprises, in association with each source page identifier within the array:
parameters for execution of applets referenced within a source page corresponding to the source page identifier;
a specification of a web browser to be employed in loading the source page; and
a number of times the source page is to be reloaded.

9. The system of claim 7, further comprising:
a test input file listing source page identifiers for source pages containing applet to be executed, wherein the test input file is read by the program initiating execution of at least one applet prior to creation of the array.

10. The system of claim 7, further comprising:
a marker file written by the at least one applet to indicate complete execution or the at least one applet and detected by the program initiating execution of at least one applet.

11. The system of claim 7, further comprising:
a test output file to which success or failure information regarding execution of the at least one applet is written by the at least one applet.

12. The system of claim 7, further comprising:
a marker file written by the at least one applet to indicate complete execution of the at least one applet and detected by the program initiating execution of at least one applet.

13. A computer program product within a computer usable medium of instructions, comprising:
instructions for creating an array of source page identifiers; and
instructions for initiating execution of at least one applet by performing, separately for each source page identifier within the array, the steps of:
selecting a source page identifier from the array;
starting a browser;
loading a source page corresponding to the selected source page identifier in the browser to initiate execution, in a runtime environment associated with the browser, of all applets referenced within the source page;
detecting completion of the applet execution;
exiting the browser; and
reloading, in a new browser application each time, the source page corresponding to the selected source page identifier a number of times specified within the array,
wherein applets referenced within different source pages corresponding to different source page identifiers within the array are executed within different instances of the runtime environment.

14. A computer program product within a computer usable medium of instructions, comprising:
instructions for creating an array of source page identifiers; and
instructions for initiating execution of at least one applet by performing, separately for each source page identifier within the array, the steps of:
selecting a source page identifier from the array;
starting a browser;
loading a source page corresponding to the selected source page identifier in the browser to initiate execution, in a runtime environment associated with the browser, of all applets referenced within the source page;
detecting completion of the applet execution; and
exiting the browser, wherein applets referenced within different source pages corresponding to different source page identifiers within the array are executed within different instances of the runtime environment.

15. The computer program product of claim 14, wherein the instructions for creating an array of source page identifiers further comprise:
instructions for reading a test input file containing a list of URLs; and
instructions for storing, in association with each source page identifier within the array:
parameters for execution of applets referenced within a source page corresponding to the source page identifier;
a specification of a browser to be employed in loading the source page; and
a number of times the source page is to be reloaded.

16. The computer program products of claim 13, wherein the instructions for initiating execution of at least one applet further comprise:

instructions for exiting the browser upon completion of execution of the at least one applet, wherein the at least one applet executes within a fresh instance of the runtime environment during each execution.

17. The computer program product of claim 14, wherein the instructions for initiating execution of at least one applet further comprise:

instructions for repeatedly loading, a number of times specified within the array, a source page corresponding to the selected source page identifier within the browser; and instructions for exiting the browser upon completion of execution of the at least one applet, wherein the at least one applet executes within a fresh instance of the runtime environment during each execution.

\* \* \* \* \*